(12) United States Patent
Yaron et al.

(10) Patent No.: US 11,449,167 B2
(45) Date of Patent: Sep. 20, 2022

(54) SYSTEMS USING DUAL TOUCH AND SOUND CONTROL, AND METHODS THEREOF

(71) Applicant: INPRIS INNOVATIVE PRODUCTS FROM ISRAEL, LTD, Jerusalem (IL)

(72) Inventors: Nissan Yaron, Efrat (IL); Ben Etzion Yaron, Efrat (IL)

(73) Assignee: INPRIS INNOVATIVE PRODUCTS FROMISRAEL, LTD, Jerusalem (IL)

( * ) Notice: Subject to any disclaimer, the term of this patent is extended or adjusted under 35 U.S.C. 154(b) by 0 days.

(21) Appl. No.: 16/626,796

(22) PCT Filed: Jun. 26, 2018

(86) PCT No.: PCT/IB2018/000800
§ 371 (c)(1),
(2) Date: Dec. 26, 2019

(87) PCT Pub. No.: WO2019/002937
PCT Pub. Date: Jan. 3, 2019

(65) Prior Publication Data
US 2020/0117287 A1    Apr. 16, 2020

Related U.S. Application Data

(60) Provisional application No. 62/524,899, filed on Jun. 26, 2017.

(51) Int. Cl.
*G06F 3/041* (2006.01)
*H04W 4/48* (2018.01)
(Continued)

(52) U.S. Cl.
CPC ............ *G06F 3/0416* (2013.01); *G06F 3/038* (2013.01); *G06F 3/04883* (2013.01);
(Continued)

(58) Field of Classification Search
None
See application file for complete search history.

(56) References Cited

U.S. PATENT DOCUMENTS

| 5,642,108 A | 6/1997 | Gopher et al. |
| 6,570,557 B1 | 5/2003 | Westerman et al. |

(Continued)

FOREIGN PATENT DOCUMENTS

| WO | 2010/016065 | 2/2010 |
| WO | 2010/051452 | 5/2010 |
| WO | 2017/029555 | 2/2017 |

OTHER PUBLICATIONS

Related U.S. Appl. No. 13/091,158, filed Apr. 21, 2011, published as US2012/0268389.
(Continued)

*Primary Examiner* — Joseph R Haley
(74) *Attorney, Agent, or Firm* — The Dobrusin Law Firm, P.C.

(57) ABSTRACT

The present teachings relate to solving a problem of quickly and accurately controlling devices, such as in a vehicle. The teachings herein solve the problems by employing both touch and sound inputs for controlling one or more functions of a user-controlled device, and to methods of controlling a device using both a touch command and a verbal command. The touch commands are preferably entered on a touch device capable of identifying multiple simultaneous contacts, such as from the simultaneous contact of multiple fingers on the touch device.

21 Claims, 10 Drawing Sheets

Navigating Using Voice and Touch Commands

(51) Int. Cl.
   *H04W 4/80* (2018.01)
   *G06F 3/038* (2013.01)
   *G06F 3/04883* (2022.01)
   *G06F 3/16* (2006.01)

(52) U.S. Cl.
   CPC .............. *G06F 3/167* (2013.01); *H04W 4/48* (2018.02); *H04W 4/80* (2018.02); *G06F 2203/0381* (2013.01); *G06F 2203/04104* (2013.01); *G06F 2203/04808* (2013.01)

(56) References Cited

U.S. PATENT DOCUMENTS

| | | | |
|---|---|---|---|
| 7,030,861 B1 | 4/2006 | Westerman et al. | |
| 8,436,828 B1 | 5/2013 | Zhai | |
| 8,624,855 B2 | 1/2014 | Weiss | |
| 8,744,645 B1* | 6/2014 | Vaghefinazari | G06F 3/0488 701/1 |
| 9,164,619 B2 | 10/2015 | Goodlein | |
| 9,261,972 B2 | 2/2016 | Yaron et al. | |
| 9,268,483 B2 | 2/2016 | Dennis | |
| 9,436,290 B2 | 9/2016 | Kang | |
| 9,459,795 B2 | 10/2016 | Yaron et al. | |
| 9,465,532 B2 | 10/2016 | Trent | |
| 9,481,246 B2 | 11/2016 | Kim | |
| 9,652,146 B2 | 5/2017 | Yaron et al. | |
| 2002/0160342 A1 | 10/2002 | Castro | |
| 2006/0155429 A1 | 7/2006 | Boone | |
| 2007/0177807 A1 | 8/2007 | Elias et al. | |
| 2008/0015115 A1 | 1/2008 | Guyot-Sionnest et al. | |
| 2008/0297482 A1 | 12/2008 | Weiss | |
| 2008/0320410 A1 | 12/2008 | Whytock et al. | |
| 2009/0237361 A1 | 9/2009 | Mosby et al. | |
| 2010/0289754 A1 | 11/2010 | Sleeman | |
| 2011/0040455 A1 | 2/2011 | Lathrop | |
| 2011/0169750 A1 | 7/2011 | Pivonka | |
| 2011/0210943 A1 | 9/2011 | Zaliva | |
| 2011/0234503 A1* | 9/2011 | Fitzmaurice | G06F 3/0425 345/173 |
| 2011/0291948 A1 | 12/2011 | Stewart et al. | |
| 2012/0162112 A1 | 6/2012 | Cho | |
| 2012/0212421 A1 | 8/2012 | Honji | |
| 2012/0268389 A1 | 10/2012 | Yaron et al. | |
| 2013/0050114 A1 | 2/2013 | Backman | |
| 2013/0194201 A1 | 8/2013 | Zanone et al. | |
| 2013/0321337 A1 | 12/2013 | Graham | |
| 2014/0028606 A1 | 1/2014 | Giannetta | |
| 2014/0160035 A1 | 6/2014 | Sauer et al. | |
| 2014/0298379 A1 | 10/2014 | Singh | |
| 2014/0300559 A1 | 10/2014 | Tanimoto et al. | |
| 2015/0011195 A1 | 1/2015 | Li | |
| 2015/0160779 A1 | 6/2015 | Huang et al. | |
| 2015/0261330 A1 | 9/2015 | Jalali | |
| 2015/0338942 A1 | 11/2015 | Stone | |
| 2016/0023604 A1* | 1/2016 | Jenson | B60K 35/00 345/7 |
| 2016/0036962 A1 | 2/2016 | Rand | |
| 2016/0110095 A1 | 4/2016 | Yaron | |
| 2016/0250985 A1 | 9/2016 | Ricci | |
| 2016/0291833 A1 | 10/2016 | Ugawa | |
| 2016/0291862 A1 | 10/2016 | Yaron et al. | |
| 2016/0306532 A1* | 10/2016 | Ko | G06F 3/04883 |
| 2016/0313868 A1* | 10/2016 | Weng | H04L 67/12 |
| 2016/0370989 A1 | 12/2016 | Yaron et al. | |
| 2017/0010799 A1 | 1/2017 | Yaron et al. | |
| 2017/0090600 A1 | 3/2017 | Yaron et al. | |

OTHER PUBLICATIONS

Related U.S. Appl. No. 15/090,061, filed Apr. 2, 2015, published as US2016/0291862.
Related U.S. Appl. No. 15/276,243, filed Sep. 26, 2016, published as US2017/0090600.
International Search Report and Written Opinion, Application No. PCT/IP2018/000800 dated Dec. 13, 2018.
International Preliminary Report on Patentability, Application No. PCT/IP2018/000800 dated Dec. 31, 2019.
[Author unknown] How it works, Internal publication by Celluon, Inc. www.celluon.com, visited Mar. 31, 2011.
Copending U.S. Appl. No. 15/255,555, filed Sep. 2, 2016, published as US2016/0370989.
Copending U.S. Appl. No. 15/241,381, filed Aug. 19, 2016, published as US2017/0010799.
Morris, Chris; http://fortune.com/2015/01/08/texting-and-driving-your-next-car-may-come-with-a-punishment-device/: last visited Apr. 4, 2016.

* cited by examiner

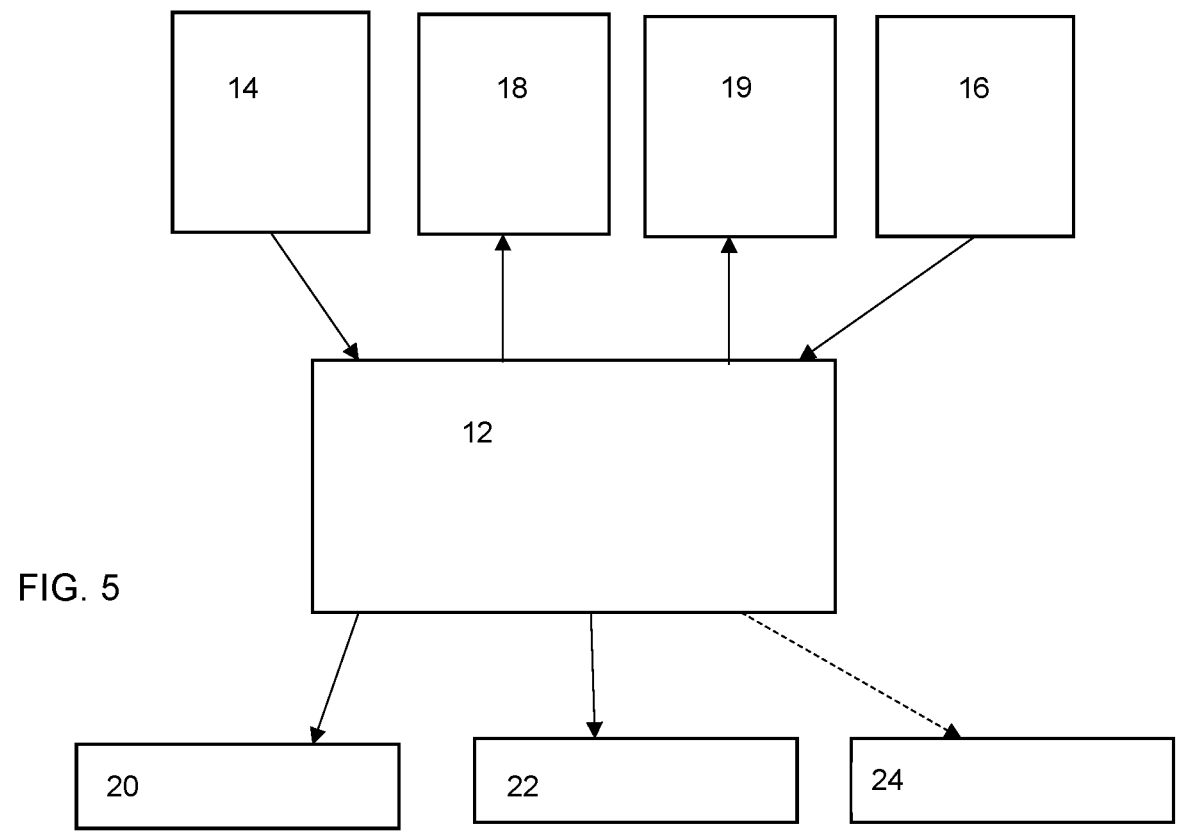
FIG. 5
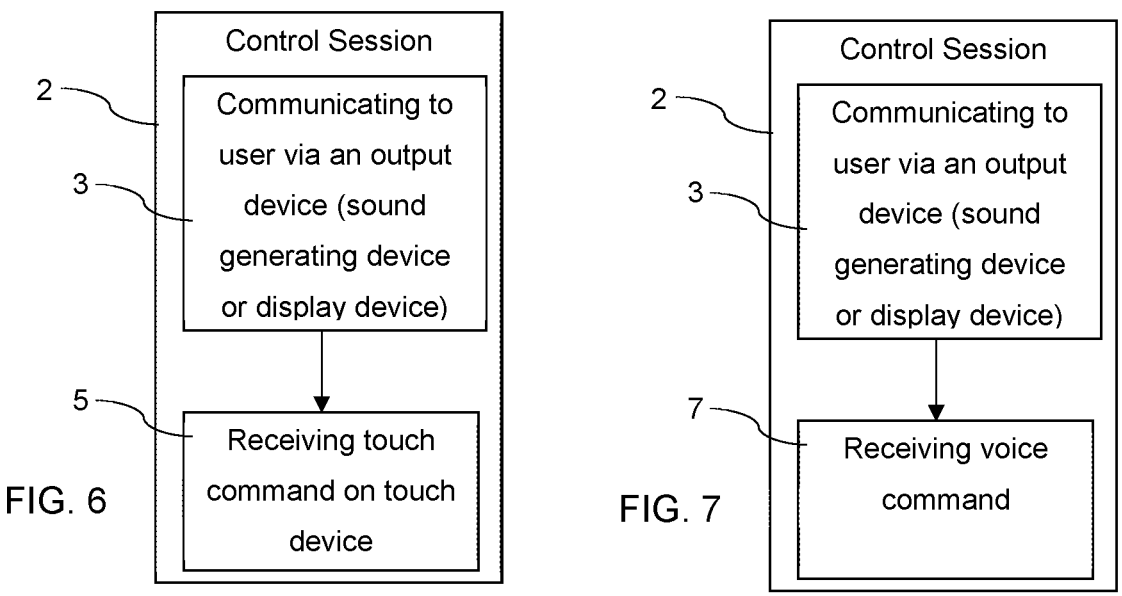
FIG. 6
FIG. 7

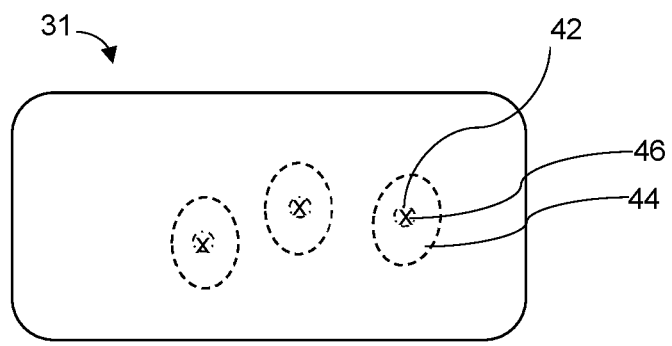
FIG. 9
42 (dashed circle)
44 (region in the dashed oval)
46 (x)
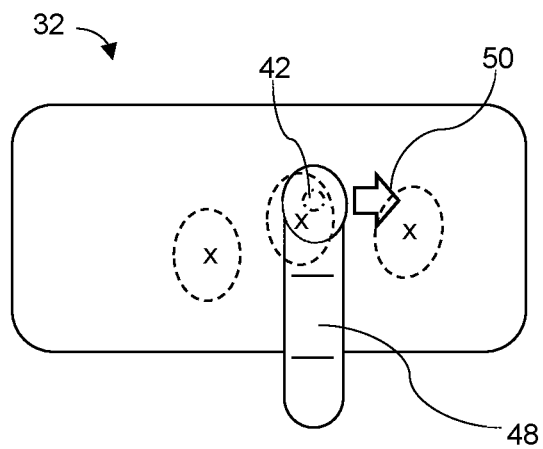 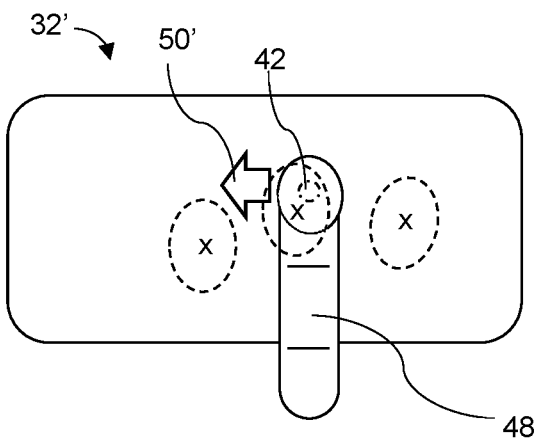
FIG. 10 A    FIG. 10B

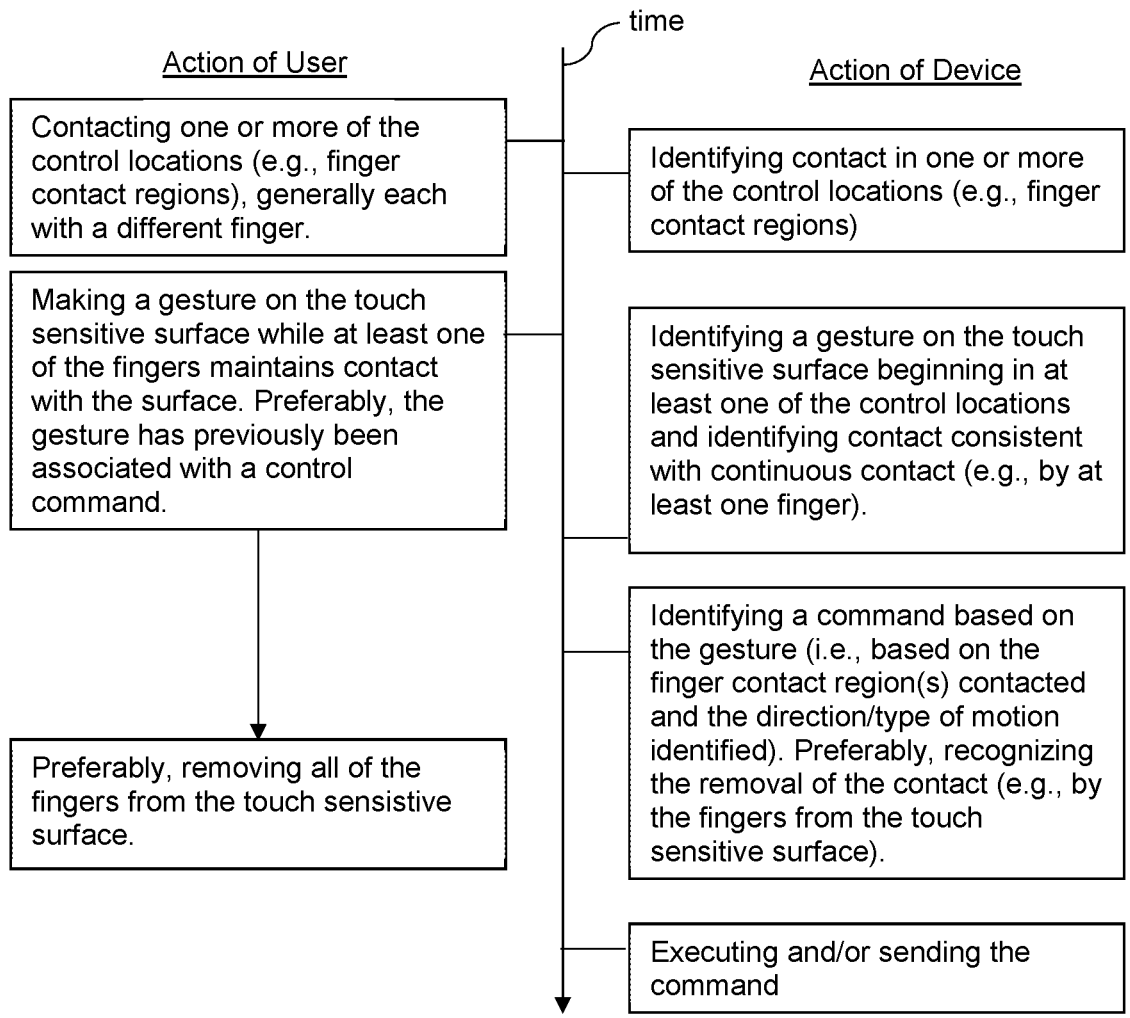
FIG. 11 – Entering a command by a gesture including contacting a finger contact region

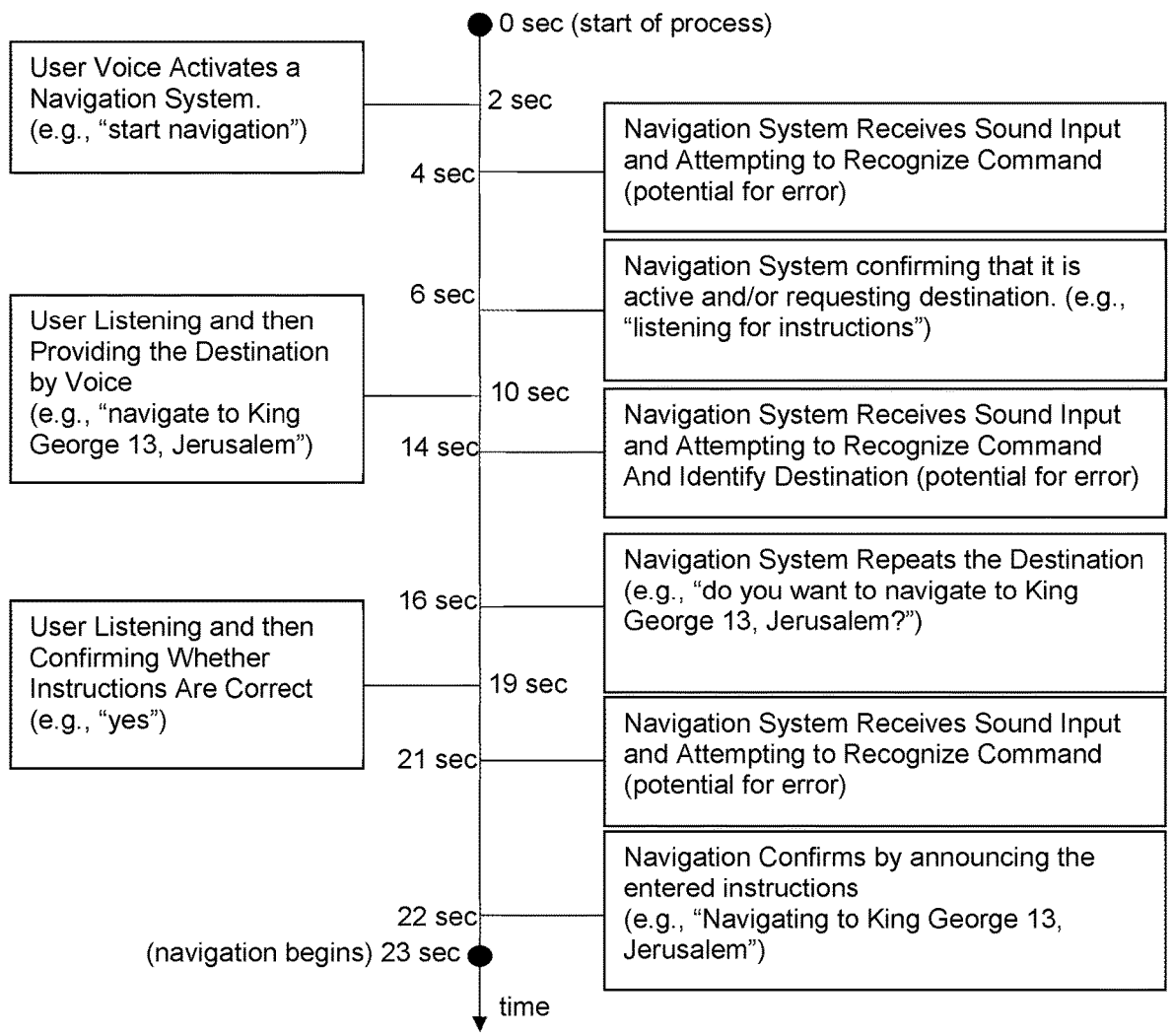
FIG. 12 Navigating Using Voice Commands

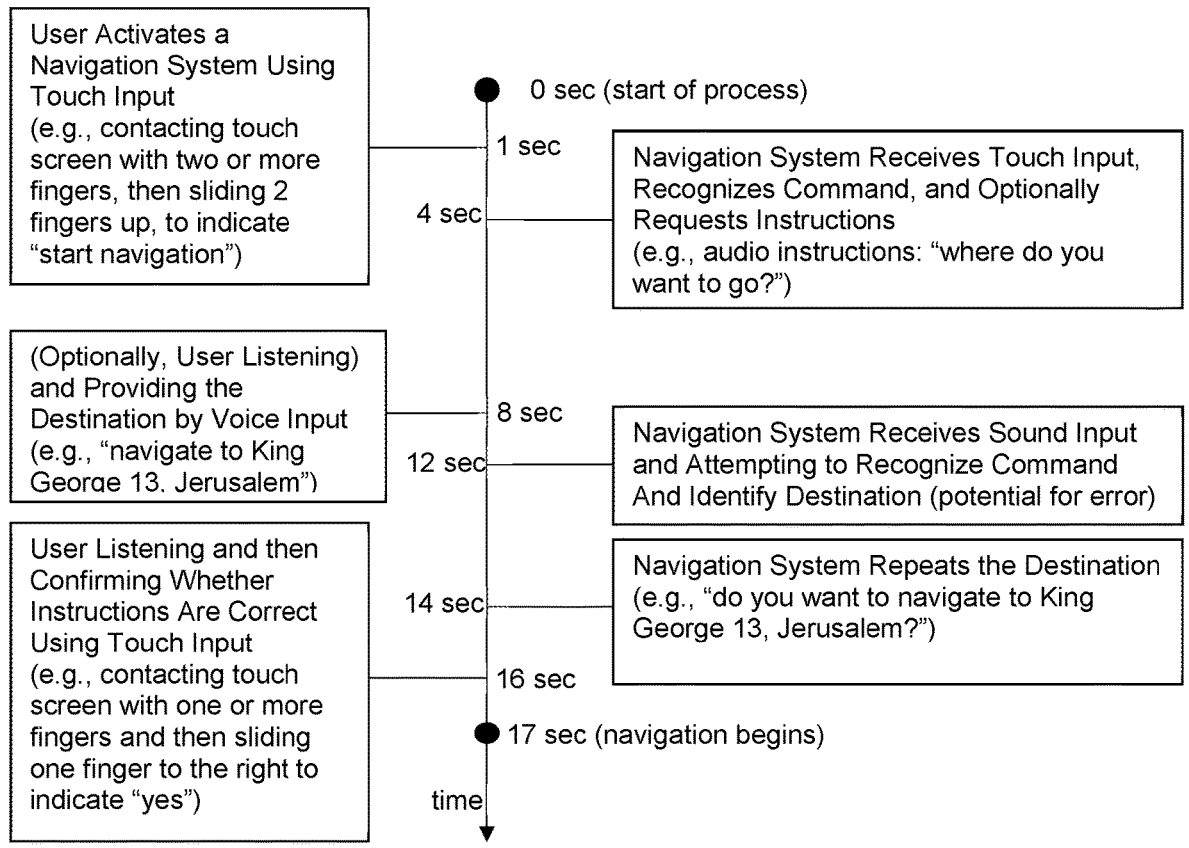
FIG. 13   Navigating Using Voice and Touch Commands

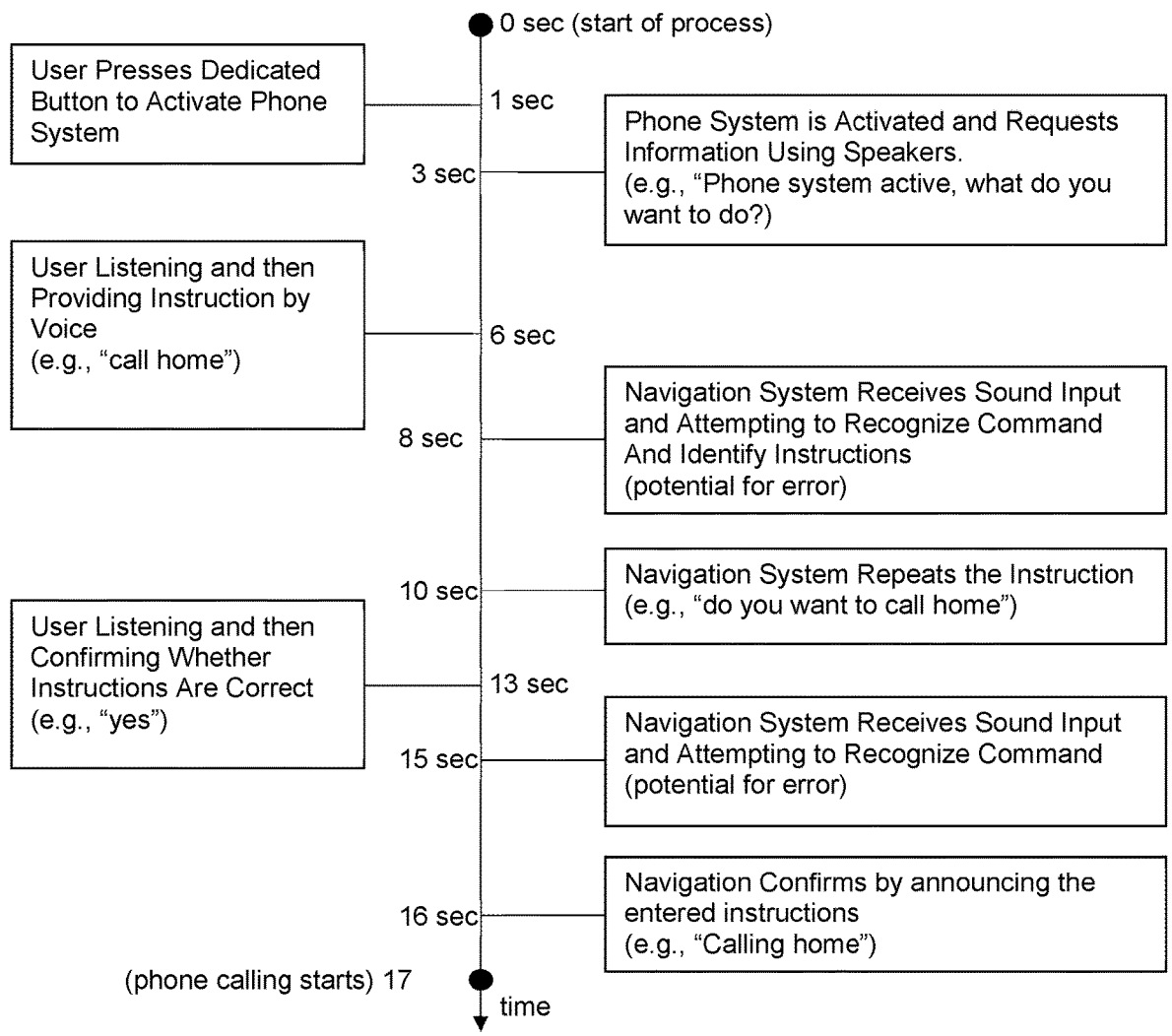
FIG. 14  Phone Calling Using Voice Commands

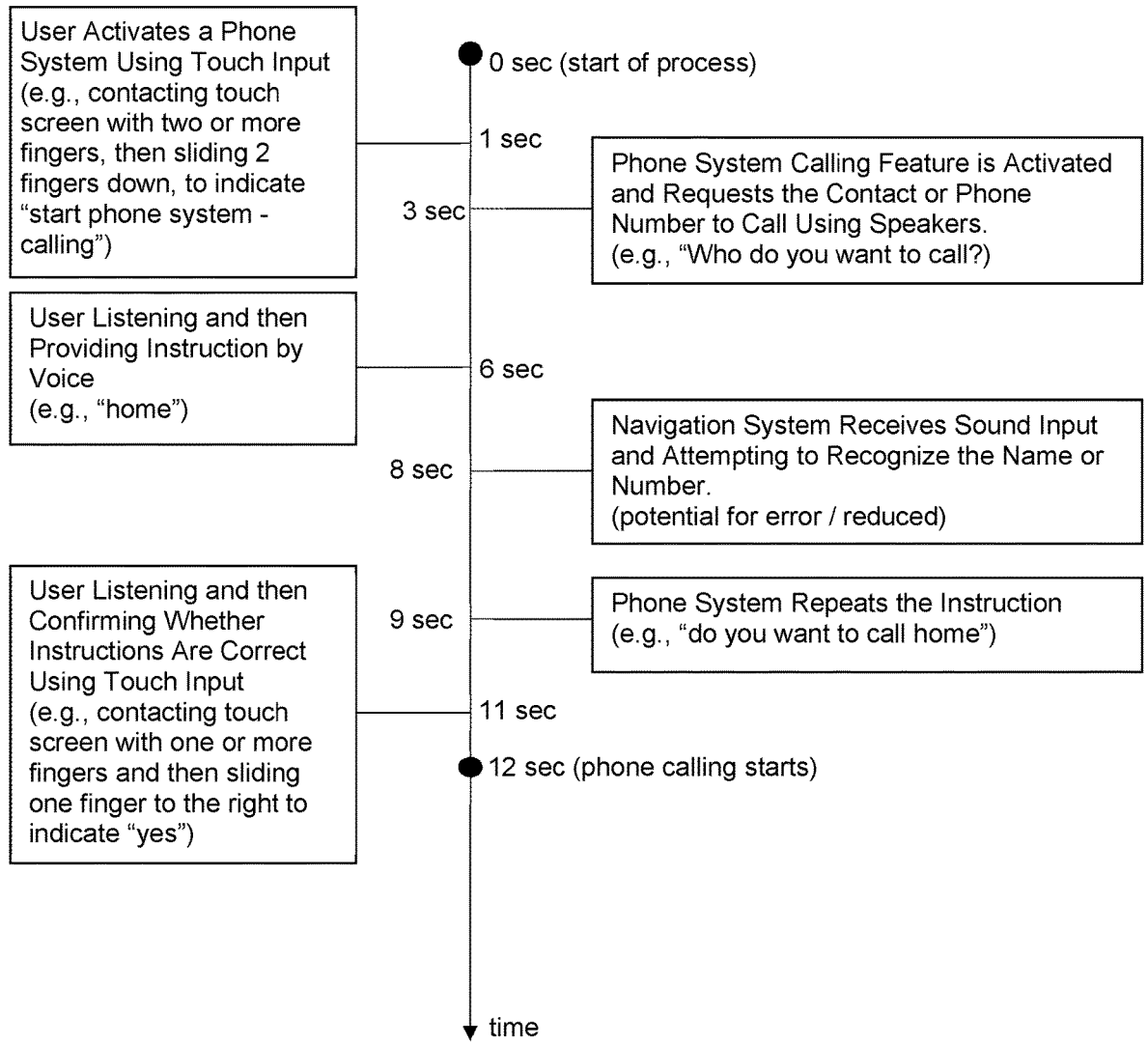
FIG. 15  Phone Calling Using Voice and Touch Commands

SYSTEMS USING DUAL TOUCH AND SOUND CONTROL, AND METHODS THEREOF

CLAIM OF PRIORITY

The present application is a national phase filing under 35 USC § 371 from PCT Application serial number PCT/IB2018/000800 filed on Jun. 26, 2018 which claims the benefit of priority of U.S. Provisional Patent Application No. 62/524,899, filed on Jun. 26, 2017, each incorporated herein by reference in its entirety.

FIELD

The present teachings relate to systems that employ both touch and sound inputs for controlling one or more functions of a user-controlled device, and to methods of controlling a device using both a touch command and a verbal command.

BACKGROUND

In a vehicle, it is important that controls commands be entered quickly and easily recognized so that any distraction to the driver is minimized.

Vehicles often have a large number of buttons and dials, each intended to control a single feature of a device. For example, the vehicle may have one button that only is capable of turning on and off a radio, another button that is only capable of turning on and off a climate control system, another button that is only capable of turning on and off a cruise control system, and another button that is only capable of turning on and off a phone system.

Vehicles having navigation systems with touch sensitive screens are also known. However, the control of such navigation systems typically requires the vehicle to be stopped due to the need for the driver to view the touch device and the resulting distractions from driving.

Vehicles have use voice commands for controlling system. However, such voice-based operating systems were found to be slow to operate and sometimes unreliable. For example, the system may require multiple voice commands and/or commands with detailed instructions, such as an instruction that includes a feature of the system and information related to the feature. With each instruction and with each increased level of detail, there is increased chance for an error to occur. The error may occur from difficulty in recognizing the speech, background noise of a driving environment (including noise inside and outside a vehicle). The time and errors may add to driver distraction.

There is a need for a control system and methods capable of controlling one or more devices with both verbal inputs (i.e., voice commands) and inputs on a touch sensitive surface (i.e., touch commands) that will decrease the time of interaction, increase the system accuracy and will lead to less driver distraction There is a need for a safe control system and methods capable of controlling multiple devices efficiently, using the same touch sensitive surface(s) combined with a sound receiver.

There is a need for a control system and methods capable of controlling multiple devices with less distraction to the driver.

There is a need for a control system and methods capable of learning and storing user preferences so that control can be performed quicker and/or with reduced distraction to the user.

SUMMARY

One or more of the aforementioned needs can be met with the systems and methods according to the teachings herein.

The methods, systems, and devices according to the teachings herein are based on the use of both touch command entry and voice command entry to control devices. The use of the combination of touch and voice commands results in faster interactions with less risk of error. This is particularly useful in environments where it is desirable to reduce distractions to the user. For example, the teachings herein may be particularly useful in vehicle systems.

One aspect of the teachings herein is directed at a system comprising a controller device, a touch device in communication (e.g., electrical communication or wireless communication) with the controller device, a sound receiving device in communication (e.g., electrical communication or wireless communication) with the controller device; and one or more user-controlled device having one or more functions controlled by the controller device at least partially based on input from a user. In this aspect, upon sensing a gesture inputted on the touch device at one or more locations of the touch device, the controller device identifies a control category associated with the gesture, the location or both, and upon additionally sensing an audio instruction inputted into the sound receiving device the controller device identifies a control feature or a control element within the control category associated with the audio instruction, and the controller device communicates a control function to the user-controlled device or directly controls the user-controlled device based on both the input on the touch device and the input received by the sound receiving device.

Another aspect of the teachings herein is directed to a system comprising a controller device, a touch device in communication (e.g., electrical communication or wireless communication) with the controller device, a sound receiving device in communication (e.g., electrical communication or wireless communication) with the controller device; and one or more user-controlled device having one or more functions controlled by the controller device at least partially based on input from a user. In this aspect, upon sensing an audio instruction inputted into the sound receiving device the controller device identifies a control category associated with the audio instruction, and upon additionally sensing a gesture inputted on the touch device at one or more locations of the touch device, the controller device identifies a control feature or a control element within the control category based on the gesture, the location(s) or both, the controller device communicates a control function to the user-controlled device or directly controls the user control device based on both the input on the touch device and the input received by the sound receiving device.

Another aspect according to the teachings herein is directed at a system comprising: a controller device; a touch device in electrical communication with the controller device; an output device for communicating to a user (e.g., a sound generating device or a display device); and one or more user-controlled device having one or more functions controlled by the controller device at least partially based on input from a user. Upon sensing a gesture inputted on the touch device at one or more locations of the touch device, the controller device identifies a control feature or a control element within the control category based on the gesture, the location(s) or both, and upon sensing a further gesture on the touch screen device or a continued gesture on the touch screen device, the controller device communicates a control function to the user-controlled device or directly controls the user control device based on the input on the touch device, and continues the control until a stop condition is met; wherein the controller communicates to the user using the output device before the control or during the control.

The various aspects according to the teachings herein may be further characterized by one or any combination of the following: the system includes a sound generating device in electrical communication with the controller device; the sound generating device produces an audio signal, an audio question, or other sound for prompting a user to make an audio input; the sound generating device requests information based on the control category; the system is a vehicle control system including, wherein the touch device, the controller device, and the sound receiving device are in a vehicle; the touch device is mounted on a steering wheel; the one or more user-controlled device includes one or more devices selected from the group consisting of a sound device (e.g., a vehicle sound system, such as for playing), a vehicle speed control device, a vehicle lighting device, a vehicle climate control device, a smart phone or other telephonic device, and a device for receiving information (preferably digital information) from outside a vehicle (e.g., a text message, weather information, travel conditions, road information, traffic information, news information, a video file, a sound file, a document file, or any combination thereof); the controller device includes a list of associations for a plurality of different gestures and/or different touch locations, each having a different associated control category; the controller device includes a list of associations for a plurality of audio instructions, each having a different associated control function; the control functions include a control function having a binary control level (e.g., on/off); the control functions include a control function having three or more control levels or having continuous control levels (e.g., speed level, volume, temperature, channel); upon identifying a first input on a surface of the touch device, the sound generating device generates a first sound (e.g., a first audio request for an audio command) and upon identifying a different input on a surface of the touch device, the sound generating device generates a different sound (e.g., a different audio request); the touch device recognizes multiple simultaneous contacts on a surface and identifies a gesture originating at one or more of the contacts including identifying which contact(s) are performing the gesture, wherein the control category is selected based on the contacts making a gesture, the number of contacts making a gesture, and the type of the gestures; the association of contacts and gestures with control categories includes a plurality of contacts at different locations on the touch device followed by gestures from only a portion of the contacts; the number of control categories is finite (preferably about 50 or less, more preferably about 30 or less, even more preferably about 20 or less, even more preferably about 15 or more, and most preferably about 12 or less); the number of control categories is two or more (preferably about 4 or more, even more preferably about 6 or more, and most preferably about 10 or more); the control categories include a contact list having contact identifiers (e.g., names) and phone numbers associated with some or all of the contact identifiers; the user-controlled device includes a navigation system and the control is based on the input of an address or an address identifier received by the sound receiving device; a confirmation input into the touch device or the sound receiving device is required for some or all of the control functions; the user-controlled device includes a sound system and the control category includes selection of file to play; or two categories are selected based on the direction of a gesture.

Another aspect according to the teachings herein is directed at a method comprising the steps of: a controller device sensing an audio instruction inputted into a sound receiving device; ii) the controller device sensing a gesture inputted on a touch device at one or more touch locations of the touch device; iii) the controller device identifying a control category associated with one of the instructions (i.e., the audio instruction or the touch device instruction); and iv) the controller device identifying a control feature or a control element within the control category, based on the other of the instructions (i.e., the other of the audio instruction or the touch device instruction). Preferably the touch device instruction includes the gesture, the touch location(s), or both.

This aspect may be further characterized by one or any combination of the following: the controller device receives the audio instruction, the controller device identifies the control category based on the audio instructions; and the controller device then receives the touch device instructions; the controller device receives the touch device instruction, the controller device identifies the control category based on the touch device instructions; and the controller device then receives the audio instructions; the method includes a step of the controller device controlling the control feature or the control element of a user-controlled device; the method includes a step of repeatedly adjusting the control feature until a stop limitation is reached or until a stop instruction is received by the sound receiving device or the touch device; the method includes a sound generating device generating a sound for communicating to a user (e.g., for requesting information, confirming an instruction, or setting up an association of gestures with control categories); the method includes displaying a text and or graphics to a user (e.g., for requesting information, confirming an instruction, or setting up an association of gestures with categories); or the method controls two or more different devices in a vehicle.

BRIEF DESCRIPTION OF THE DRAWINGS

FIG. 5 is a drawing showing illustrative features that may be included in a control system according to the teachings herein.

FIG. 6 is a drawing showing illustrative features that may be included in a control process according to the teachings herein.

FIG. 7 is a drawing showing illustrative features that may be included in a control process according to the teachings herein.

FIG. 9 is a drawing showing an illustrative touch surface with multiple contact locations.

FIG. 10A is a drawing showing an illustrative gesture being received by a touch surface.

FIG. 10B is a drawing showing a different gesture being received by the touch surface.

FIG. 11 is a drawing showing examples of time sequence for illustrative steps of a control process.

FIG. 12 is a drawing showing feature that may be employed in a navigation system that relies entirely or substantially on voice commands.

FIG. 13 is a drawing showing illustrative features that may be employed in a navigation system that uses both touch and voice commands.

FIG. 14 is a drawing showing feature that may be employed in a phone system that relies entirely or substantially on voice commands.

FIG. 15 is a drawing showing illustrative features that may be employed in a phone system that uses both touch and voice commands.

DETAILED DESCRIPTION

The explanations and illustrations presented herein are intended to acquaint others skilled in the art with the invention, its principles, and its practical application. Accordingly, the specific embodiments of the present disclosure as set forth are not intended as being exhaustive or limiting. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The method, systems, devices and apparatus for the control sessions according to the teachings herein are generally based on one or more processor for identifying both i) one or more contacts with a touch sensitive surface, and ii) one or more voice commands, resulting in the selection of one or more control command.

Control System

Figure 1:
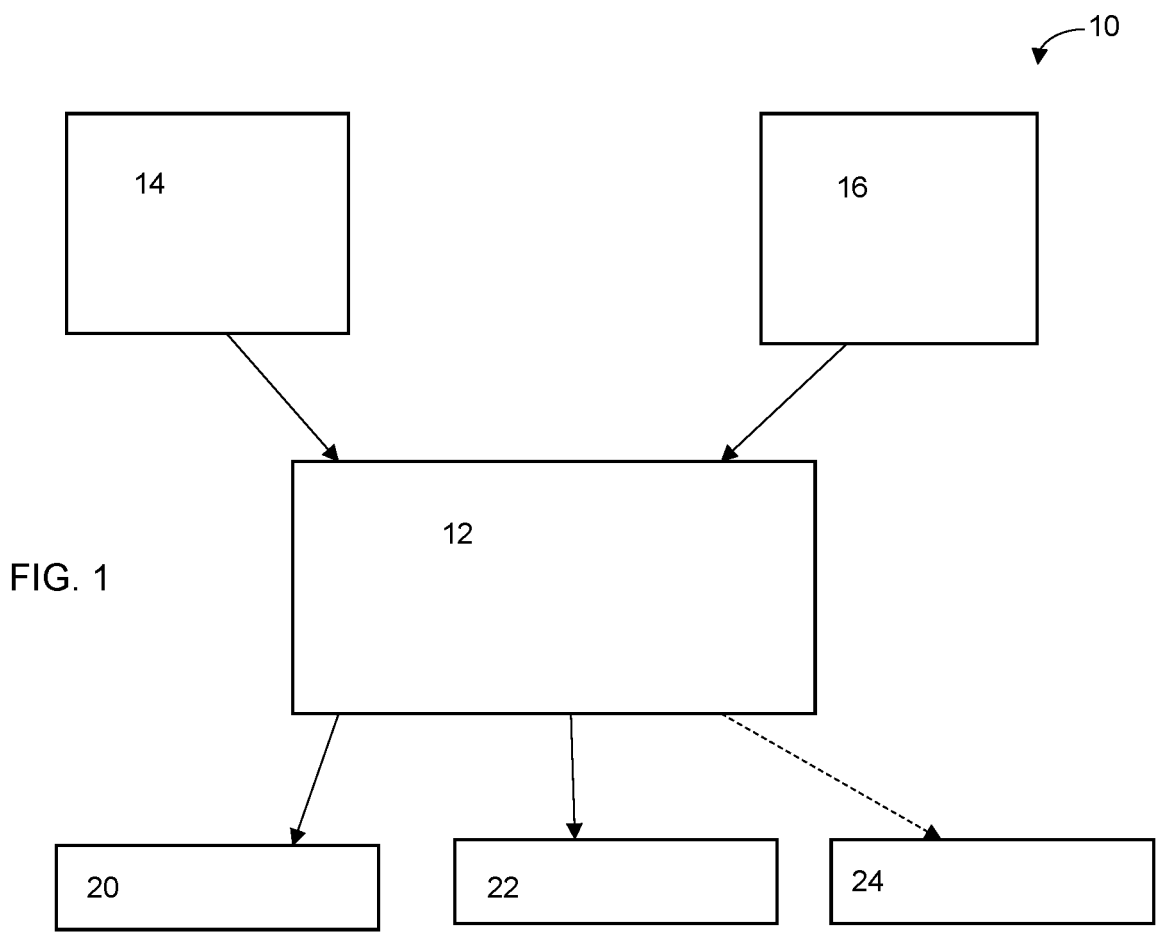
FIG. 1 is a drawing showing illustrative features that may be included in a control system according to the teachings herein.

With respect to FIG. 1, a control system 10 includes two or more different devices for receiving control commands from a user. Preferably, the control system 10 includes one or more touch devices 14 for receiving a touch command, and one or more sound receiving devices 16 for receiving a voice command. The touch command and the voice command are preferably from the same user. As such, the touch device and the sound receiving device preferably are positioned proximate a user. More preferably the touch device and the sound receiving device are positioned proximate a driver of a vehicle. The control system 10 may include one or more controller devices 12 in communication with the touch device(s) 14 and the sound receiving device(s) 16. Based on the sound command (e.g., voice command) and the touch command from a user, the controller device 12 may identify a user-controlled device 20, 22, 24 to be controlled, and/or a control setting to be made (e.g., an absolute setting or a change to a setting).

The methods, devices, and systems according to the teachings herein may employ one or more of the features described in U.S. patent application Ser. No. 13/091,158 filed on Apr. 21, 2011, and U.S. Provisional Patent Application No. 62/142,170, filed on Apr. 2, 2015 entitled SYSTEM, APPARATUS AND METHOD FOR VEHICLE COMMAND AND CONTROL, and U.S. Patent Application Pre-Grant Publication 2017/0010799A1 by Yaron et al., published on Jan. 12, 2017, each incorporated herein by reference in its entirety.

The control session may include one or any combination of the features described in paragraphs 009 to 0021 and 0045 to 0051 of US 2017/0010799A1, incorporated herein by reference. The touch sensitive surface may include one or any combination of the features described in paragraphs 0051 to 0056 of US 2017/0010799A1, incorporated herein by reference. The control method or control system may employ one or any combinations of the features of the mode for initial positioning of control locations, such as described in paragraphs 0057 to 0066 of US 2017/0010799A1, incorporated herein by reference. The control method or control system may employ one or any combination of the features of the mode for entry of control commands, such as described in paragraphs 0067 to 0108 of US 2017/0010799A1, incorporated herein by reference.

Control Session

The control session is predicated on a controller device communicating with multiple input devices and receiving both sound input and input on a touch screen device for controlling a device or features of a device. Both sound input and touch input allow for entry of a large number of different inputs. For example, any word or phrase inputted into a sound receiving device can be associated with a specific feature and/or a specific device to be controlled. Similarly, by employing a plurality of touch locations (preferably 3 or more) on a touch sensitive surface and/or by recognizing different types or directions of gestures, a controller can identify a large number of different touches, each of which may be associated with a specific feature and/or a specific device to control. Input on a touch sensitive device may also employ the length of a contact for the control of a device.

A sound input device may be used most advantageously for inputting a selection when there are a large number of selections. The sound input preferably is a voice command, and the system may include a voice-recognition system (e.g., for interpreting a voice command).

A touch input device may be used most advantageously when inputting from a more limited selection, when time control is beneficial, or when a type of gesture may be intuitively associated with a control. An example of an intuitive association of a control is the association of a direction of a gesture with the increase of a control, such as increase of temperature, increase of volume, increase of a station number. Similarly, a reverse direction of a gesture may be associated with a decrease of a control.

It will be appreciated that additional input devices, such as a knob, button, or switch, may additionally be employed in the methods and systems described herein. However, by using the combination of both a touch screen device and a sound input device, the need for such devices may be reduced or eliminated. For example, such input devices may be included in a system only as a backup or secondary mean of control.

Touch Device

The methods and systems according to the teachings herein may employ a touch device (i.e., a device having a touch sensitive surface) as a component in an input device for inputting commands. As used herein, a touch sensitive surface is capable of identifying the location of multiple simultaneous contacts on the surface. Each contact preferably includes a sufficient force applied to the surface as required by the touch sensitive surface to recognize a contact. The touch sensitive surface may be a flat surface, may be a curved surface, or may have regions that are flat and regions that are curved. Preferably the touch sensitive surface is characterized as being generally smooth and or having a generally uniform texture. For example, the touch sensitive surface may be sufficiently smooth and/or have a sufficiently uniform texture so that a user cannot identify the location of contact of the surface based on the surface topography or other tactile clues on the surfaces.

The touch sensitive surface may be a surface of a pure entry component or device (i.e., a component or a device that does not display images), such as a touch pad, or may be a surface of a combination entry/display component or device, such as a touch-screen display.

The touch device may be in a vehicle, preferably mounted on a steering device. The touch sensitive surface preferably is positioned so that a vehicle driver can contact the surface with one or more fingers without removing his hands from the steering wheel.

As used herein, a touch command refers to a command entered using a touch screen device. The touch command may include a tap or other point contact. The selection of touch command preferably includes a gesture, such as a sliding motion or a rocking motion. For example, the gesture may include a swaying motion, such as described in U.S. Provisional patent application Ser. No. 15/276,243 filed on Sep. 26, 2017 by Ben-Etzion Yaron, the contents of which are incorporated herein by reference in its entirety. The selection of touch commands preferably includes contacts (gesture or otherwise) simultaneously with two or more fingers). Because of the large number of possible touch commands (e.g., based on whether the command touch is a point contact or a gesture, the direction of motion of the gesture, the specific finger/contact region from which the command touch originates, the number of fingers making the command touch, very specific instructions can be inputted into a system using a single touch command. Thus, the "vocabulary" of the touch screen device is much greater than a switch (e.g., having a binary vocabulary of "on" and "off". Although a voice recognition system may have a larger vocabulary, it is prone to error due to inability to recognize the words being spoken by the user. In contrast, commands entered by a touch screen device are less prone to recognition error. By using a touch system with a high vocabulary (e.g., the ability to recognize between 6 or more, 8 or more, 10 or more, 12 or more, 14 or more, or 20 different touch commands), it is possible to more precisely input the control features that are desired. For example, in a system (e.g., a phone system), there may be multiple features (e.g., a call feature, a phone book setup feature, a phone Bluetooth feature, and the like) and by using a single touch command, a user can identify precisely which feature is desired. Based on the more precise selection of system feature, the need for detailed voice commands for subsequent entries may be reduced or eliminated. As another example, based on the large vocabulary, a single touch screen device may be used to control multiple devices or systems.

The touch device and/or a processor connected to the device preferably is capable of recognizing each of multiple contacts to the surface, the maintaining of the contact, the movement (if any) of the contact, and the termination (i.e., removal) of the contact.

Figure 2:
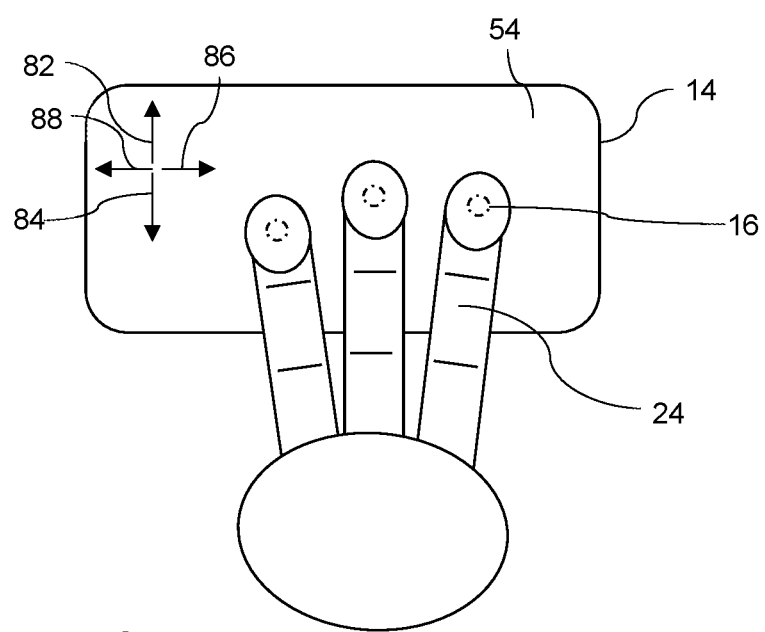
FIG. 2 is a drawing showing features that may be included in a touch device according to the teachings herein.

An illustrative touch sensitive surface is shown in FIG. 2. With reference to FIG. 2, the touch device 14 includes a touch sensitive surface 54. The touch sensitive surface may have a first direction 82 (e.g., an upward direction) and an opposing second direction 84 (e.g., a downward direction). The touch sensitive surface may have a third direction 86 (e.g., a rightward direction) and an opposing fourth direction 88 (e.g., a leftward direction). The first and second directions 82, 84 may be generally orthogonal to the third and fourth 86, 88 directions. When describing the directions as upward, downward, rightward and leftward, it will be appreciated that the descriptions refer to the first, second, third and fourth directions, and may have alternate meanings depending on the actual orientation of the touch sensitive surface. For example, when a touch sensitive surface is oriented on a horizontal plane, the upward and downward directions may in actuality refer to a forward direction and a backward direction respectively. Similarly, the directions may be adjusted based on the orientation of a user's hand relative to the device. Such a change in orientation may be recognized when three or more fingers simultaneously contact the surface (e.g., based on a general curve of finger tips).

Sound Receiving Device

The sound receiving device may be any device capable of receiving a sound input. The sound receiving device may include a microphone (e.g., directional or otherwise) for receiving a sound input. The receiving device may include one or more features for filtering, amplifying, isolating, or otherwise receiving the sound for better identification of the sound. The device or a controller may convert the sound to a digital representation of the sound. Any manipulation of the sound may occur before the sound is received (e.g., by a microphone), may occur in the microphone, may occur in the sound receiving device, or may occur in the controller.

Controller

The control system includes one or more controllers. Although the controller will be described as a single controller, it will be appreciated that various features of the controller may be divided into two or more controllers. The controller may perform multiple functions including: identifying that a sound input has been received; converting a sound input into a text (e.g., by voice recognition); identifying that a touch input has been received; converting the touch input into touch features for each touch, such as a gesture, a touch time, or a touch location. The controller may identify a device to be controlled based on one of the inputs. The controller may identify a feature of the device to be controlled based on one the inputs. The controller may identify a direction of change for the feature, or a level of change for the feature. The controller may have or otherwise access one or more association tables for associating an input with a device or device feature or direction level of change to be controlled. The controller may directly control a device or may communicate control instructions to the device.

User-Controlled Devices

The system according to the teachings herein may be employed to control one or more user-controlled devices. Preferably the system controls two or more devices.

The system may be employed in a vehicle for controlling one, two or more devices in a vehicle. For example, the system may be employed for controlling features of one, two, or more of the following devices of a vehicle: a vehicle sound system (e.g., including a stereo, a media player, speakers, or any combination thereof), a vehicle climate control system, a hands-free phone system, a navigation device, a speed control device, a web navigation (or web searching) device, an information system in the vehicle, an information outside of the vehicle, or a lighting control device.

The system may be employed to control features of these devices. For example, the system may be employed for one or any combination of the following: turning on a sound system, turning off a sound system, increase the volume of a sound system (e.g., by a specified amount, by a predetermined amount, or until a stop condition is reached), changing a mode of a sound system (e.g., to AM radio mode, to FM radio mode, to compact disk mode, to MP3 player mode, to satellite radio mode, to auxiliary media mode), changing a station or a track being played; temporarily muting the sound system, changing a speaker selection or mode (e.g., bass level, fade between front and rear speakers, treble level, balance between right and left speakers, or a style setting corresponding to the type of music), turning on (or off) a seat heater, turning on (or off) a steering wheel heater, turning on (or off) an air heater (e.g., including a fan); changing a fan speed; changing a temperature setting; opening (or closing) a vent; turning on (or off) a navigation system, setting a destination for a navigation system, changing the volume of a navigation system, changing the zoom level of a navigation system display, turning on/off a hands-free phone system, identifying a number to call, placing a call, ending a call, listening to a voice message, turning on (or off) a light in the vehicle (e.g., map light, dome light, dashboard light), turning on (or off) a light outside the vehicle, changing the intensity of one or more lights, turning on (or off) a speed control device, increasing or decreasing a set speed, pausing or resuming speed control, searching information on the web, searching user stored contact information stored on the web (e.g., phone number, address, or e-mail address), searching user stored media, searching web audio options, searching for audio categories, or searching audio groups or artists.

It will be appreciated that similar devices may be controlled in an office or a home using a touch screen device having a microphone.

The system according to the teachings herein preferably includes one or more databases or other stored information correlating inputs from a combination of at least a touch device and a sound receiving device for determining a category or device to control and for making a selection of the feature.

The system preferably employs two or more steps for controlling at least some of the devices. For example, the system may employ a first input from a first input device for selecting a category and a second input from a different input device for determining the feature selection.

The process may first obtain a touch command from a touch device. Then the controller may determine a category for control. The controller may then wait for the sound receiving device to receive a sound command for refining the selection and then initiating the control, based on the selection.

The process may first obtain a sound command from a sound receiving device. Then the controller may determine a category for control (e.g., based on the sound command). The controller may then wait for the touch device to receive a touch command for refining the selection and then initiating the control, based on the selection.

The process may first obtain an initial command entered on a touch device. Then interacting with a sound command by additional interactions with the touch device. As an illustrative example, initial command is to control temperature in a controlled environment (e.g., a passenger compartment of a vehicle, a steering wheel, a seat). Then the system may announce a setting and incrementally change the setting based on one or more contacts with the touch device. For example, a touch with the device may indicate that desire to control a temperature and a motion may indicate the type of the control (e.g., a downward motion may indicate that the temperature should be decreased and an upward motion may indicate that the temperature should be increased). The user may input the desired temperature by maintaining contact or by repeated tapping of the touch device until the system announces or displays the correct desired temperature. If the temperature is 14° C. and the user wants the temperature to increase to 22° C., the user may continue to make the contact as the set temperature increases incrementally by about 0.2 to 1.5° C. (for example about 0.5° C. or about 1.0° C.) at regular time intervals (e.g., every 0.2 to 10 seconds). The system may announce (e.g., by an output display device or an audio output device) the set temperature "14 . . . 15 . . . 16 . . . 17 . . . 18 . . . 19 . . . 20 . . . 21 . . . 22 . . . ". Upon hearing or seeing the announcement that the set temperature is the desired set temperature (e.g., 22°), the user may stop the entry contact(s) with the touch screen device.

Feedback Loop

The methods may employ a feedback loop wherein the system engages with the user two or more times. For example, the feedback loop may continue repeatedly until a positive feedback is received. Positive feedback may be a command from the user that indicates that the desired results of the control are complete and/or acceptable. As an example, a feedback loop may be used for controlling a sound system. When selecting a station or media for playing, the control system may request confirmation (e.g., verbally or through a touch device) that the station or media being played is acceptable. The request for confirmation or other information may be after a sufficient time (e.g., a predetermined time, or otherwise) so that a user typically has an opportunity to determine whether to continue playing the station or media. Upon receiving a negative response, the system may select a different station or media and repeat the process of requesting feedback. Upon not receiving any response, the system may repeat a request (preferably after a predetermined time). Upon not receiving any response (e.g., after one, two, three, or more requests), the system may stop making additional repetitions of the request. As another illustrative example, the control may be for adjusting a temperature or fan speed of a climate control device. The feedback loop may be employed to incremental adjust the temperature or fan speed multiple times until positive feedback is received and/or until no response is received. For example, a control may be initiated following the system recognizing an input (e.g., a verbal input) that the user is cold (e.g., the user stating: "I am cold"). After the temperature has increased in the controlled environment (e.g., by changing a fan speed and/or a temperature of air entering the controlled environment), the system may inquire whether the environment is now acceptable (e.g., the system stating "are you still cold?").

A feedback loop may be employed for determining a user's preferences. The user's preferences may be stored for a future control session. As an illustrative example, a feedback loop may be for a station or media for a sound system. The system may determine features of the station or media that the user selects and/or that the user does not select. Preferred features may include information regarding the type of station (e.g., news, comedy, talk, sports, political, comedy, business, religious, type of political, music, type of music, or any combination thereof) or information regarding the particular broadcast (e.g., musical artist, album name, sports team, name of program, anchor or host of the show). As an illustrative example, a user's preference may indicate that the user generally listens to a particular broadcast, such as of games of one or more teams (e.g., Manchester United). In a future control session, the system may alert the user that a particular broadcast is currently available (preferably including the status of the broadcast), such as a game of the team is currently being broadcast (e.g., "would you like to listen to the Manchester United football game currently having 5 minutes remaining").

A user's preference may be employed to accelerate a control session or to make for a more satisfying user experience. A user's preference may be employed to reduce any distraction to the user. This may be particularly important when the user is driving a vehicle.

A user's preference may be employed for one or more users. When the system employs user's preferences for two or more users, the system may include one or more user identification steps or protocols for setting up or identifying a user. The identification of a user may be employ any entry method capable of inputting identifying information into the system. The identifying information preferably includes one or more touch entries, one or more voice commands, or the sensing of one or more biometric characteristics (e.g., a biometric characteristic of a finger, a speech, a cardiovascular system, an eye, or facial features).

The system may be free of a user's preference(s), may avoid use of a user's preference(s), may be capable of resetting one or more user's preferences, or may be capable of by-passing one or more user's preferences.

The control system 10 according to the teachings herein typically includes two or more input devices, such as illustrated in FIG. 1. Preferably, the two or more input devices includes one or more touch devices 14 and one or more 16 sound receiving devices. The input devices 14, 16 are in communication with a controller device 12. Based on the user input to at least a touch device 14 and to a sound receiving device 16, the controller device controls one or more user-controlled devices 20, 22, 24. The control of the user-controlled device may be directly or indirectly from the controller device. Generally, the control system will control two or more user-controlled devices, two or more features of a user-controlled device, or both.

Figure 3:
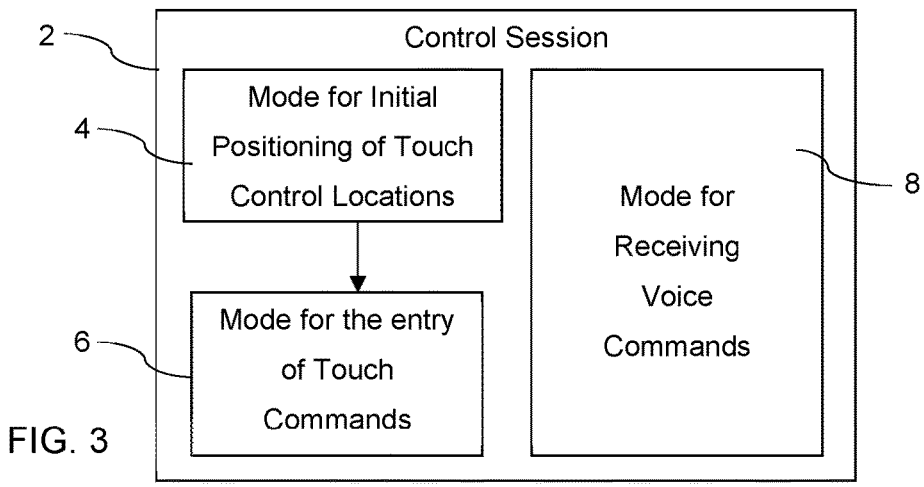
FIG. 3 is a drawing showing illustrative features that may be included in a control process according to the teachings herein.
Figure 4A:
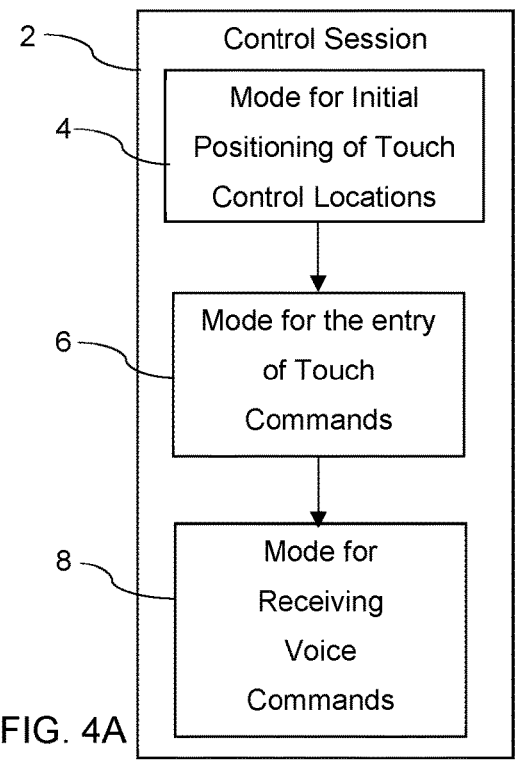
FIG. 4A is a drawing showing illustrative features that may be included in a control process according to the teachings herein.
Figure 4B:
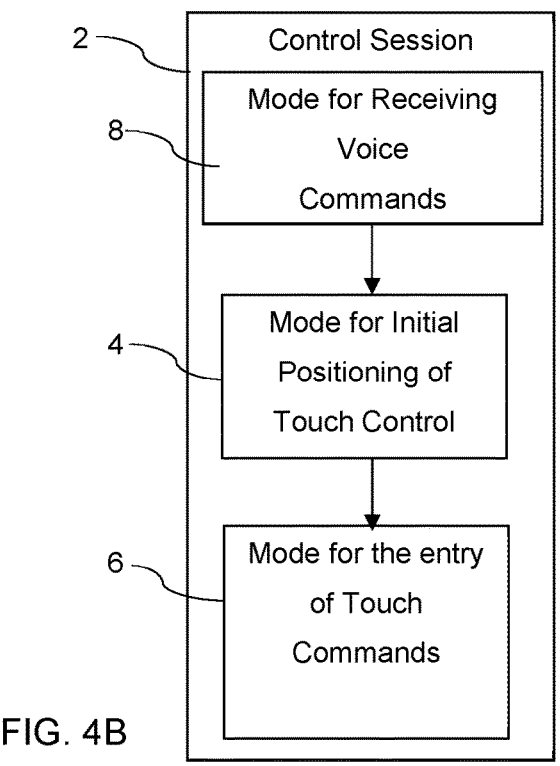
FIG. 4B is a drawing showing illustrative features that may be included in a control process according to the present teachings.

The control system and control method are predicated on a control system having a plurality of modes. For example, a control session 2 may include a mode for communicating with a touch sensitive surface. Preferably, the mode for communicating with a touch sensitive surface includes a mode for initial positioning of touch control locations 4 and a mode for the entry of touch commands 6. The control session 2, preferably includes a mode for receiving a voice command 8. The mode for entry of a touch command 6 and the mode for receiving voice commands 8 may be active at the same time, such as illustrated in FIG. 3. For example, the control system may be ready for receiving inputs from any of the input devices and the control will proceed based on the input device which receives an input first. A control session 2 may sequence from a mode for initial positioning of touch control locations (i.e., on the touch sensitive surface) to a mode for the entry of touch commands and then to a mode for receiving voice commands, such as illustrated in FIG. 4A. A control session 2 may sequence from a mode for receiving voice commands to a mode for initial positioning of touch control locations (i.e., on the touch sensitive surface) and then to a mode for the entry of touch commands, such as illustrated in FIG. 4B.

The system may include one or more output devices for communicating with a user. For example, the system 2 may include a sound generating device 18 or a display device 19, such as illustrated in FIG. 5. The output device(s) preferably are in communication with the controller device 12. The output device may be employed for prompting a response from a user, for confirming a response previously received, for requesting instructions for a control loop, or any combination thereof. For example, the control session 2 may include a step of the controller communicating to the user via an output device 3 and then the controller receiving a touch command on a touch device 5, such as shown in FIG. 6. As another example, the control session 2 may include a step of the controller communicating to the user via an output device 3 and then the controller receiving a voice command 7 from the user (preferably via the sound receiving device), such as shown in FIG. 7.

Figure 8:
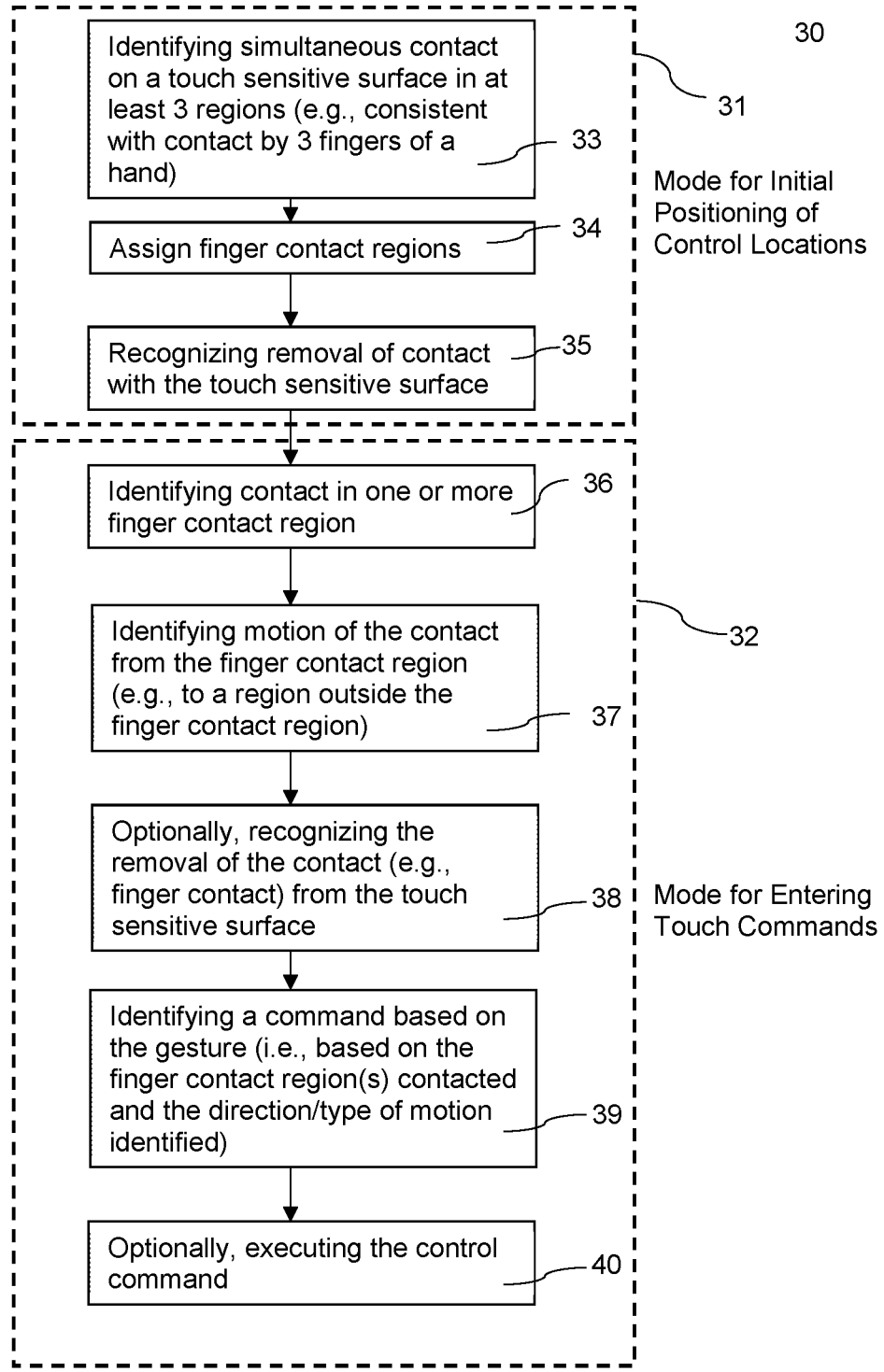
FIG. 8 is a drawing showing illustrative features that may be included in a control process according to the teachings herein.

The system may include a touch control system that includes a first mode for initial positioning of control locations, and a second mode for entering touch commands. Such a touch control system may include one or any combination of the features illustrated in FIG. 8. The mode for initial positioning of control locations may include a step of Identifying simultaneous contact on a touch sensitive surface in at least 3 regions (e.g., consistent with contact by 3 fingers of a hand). Based on the contacts, the system may assign finger contact regions (i.e., control locations) for each location of contact. The end of this mode may be triggered after a predetermined time, or by a change in the contact of the surface. For example, the mode for initial positioning of control locations may end after recognizing the removal of one or more (e.g., all) of the contacts with the touch sensitive surface. The mode for entering touch commands may occur immediately at the end of the mode for initial positioning of control locations or may occur after a delayed time (e.g., based on the user's ability to enter a command due to focus on driving). The entering of a touch command may include identifying contact in one or more finger contact regions, This may be a new contact, or a continued contact after removing of one or more of the fingers (e.g., at the end of the mode for initial positioning the control locations). The method may include a step of identifying motion of the contact from the finger contact region (e.g., to a region outside the finger contact region). The entry of the gesture or other contact may end when the finger is removed from the surface or when movement is substantially stopped. For example, the method may include a step of recognizing the removal of the contact (e.g., finger contact) from the touch sensitive surface and/or the recognizing the end of a movement of the contact. The method may include a step of identifying a command based on the gesture (i.e., based on the finger contact region(s) contacted and the direction/type of motion identified). For example, the contact/gesture information may be used to obtain the control command from a look-up table. The command may execute the command or send the command to a device so that the device may execute the command.

After assigning the finger contact regions, the touch screen device may include contact a plurality of finger contact regions such as illustrated by FIG. 9. Only a portion of the touch screen surface is assigned to a finger contact location. When finger contact regions are employed, the regions outside of the finger contact locations generally cannot be used for starting a touch command entry. With reference to FIG. 9, each of the control locations 44 (i.e., the finger contact regions) include a touch locations 42 (i.e., the point or region of contact of touch sensitive surface (dashed circle) during the positioning of the finger contact regions. The control location 44 is generally larger than the touch location 42 to allow for some error in positioning of a contact away from the original touch location during subsequent contacts. The control location 44 may be characterized by a center 46 of the control location.

The touch screen device may be employed for entering a gesture (preferably starting in a control location) such as illustrated by FIGS. 10A and 10B. For example, the gesture may be a motion from a control location and moving to the right (FIG. 10A) or a motion from a control location and moving to the left (FIG. 10B). The gesture may start at any control location. Preferably, the control command entered by the touch depends on both the control location that the gesture starts from and the motion of the gesture. For example, FIG. 10A starts from the second control location for entering a control command (touch command). However, a different control command would be entered if the gesture starts at the first or third control locations. The entry of a control command may employ one or any combination of the features illustrated in FIG. 11.

A system according to the teachings herein (e.g., including both a touch command entry and voice command entry) may be employed for controlling a navigation system. The process of controlling the navigation system may include one or any combination of the features illustrated in FIG. 13. The navigation system using both voice and touch commands may be faster and less prone to error compared with a system that uses only voice command, such as illustrated in FIG. 12. For example, the initial touch command may be interpreted by the system that a navigation should be started and that the next entry will be a voice command informing of the destination. Thus, it may be possible to even avoid the step of the navigation system requesting instructions. For example, the navigation system may require the user to provide only one voice command for the navigation to a destination (e.g., identifying the name, address, or other identifier of the destination). In an initial single touch command, the user may select not only to start the navigation, but also select that the navigation feature to use for identifying the destination (e.g., whether the destination will be given as a street address, whether the destination will be given as an address book name, or whether the address will be given by searching for a point of interest, such as a gas station). With the specificity and precision of the touch command entry, the speed of using the navigation system is improved, the possibility of errors is reduced, and distraction to the user is reduced.

A system according to the teachings herein (e.g., including both a touch command entry and voice command entry) may be employed for controlling a phone system. The process of controlling the phone system may include one or any combination of the features illustrated in FIG. 15. The phone system using both voice and touch commands may be faster and less prone to error compared with a system that essentially uses only voice command, such as illustrated in FIG. 14. For example, the initial touch command may be interpreted by the system that the user wants to place a call and that the next command entry will be a voice command informing of the name, number, or other identifier of the number to call. Thus, it may be possible to even avoid the step of the phone system requesting instructions. The phone system may require the user to provide only one voice command for the phone call to a destination (e.g., identifying the name, phone number, or other identifier of the phone number).

A single control system may be employed for control of multiple devices./device systems. For example, a single control system may be employed for controlling both a navigation system (e.g., including one or any combination of the features illustrated in FIG. 13) and a phone system (e.g., including one or any combination of the features illustrated in FIG. 15). The control system may employ one or more commands for starting a first device system (e.g., for navigation system) and one or more different commands (e.g., different gestures, different contact locations, different number of contacts, etc.) for starting a second device system (e.g., for a phone system).

2 Control Session/Control process
3 Communicating to user via an output device (e.g., a sound generating device or a display device)
4 Mode for initial positioning of touch control locations
5 Receiving a touch command on a touch device
6 Mode for entry of touch commands
7 Receiving a voice command
8 Mode for receiving voice commands
10 Control System
12 Controller Device
14 Touch Device (input device)
16 Sound Receiving Device (input device)
18 Sound generating device
19 Display device
20 User-Controlled Device (#1)
22 User-Controlled Device (#2)
24 User-Controlled Device (#3)
30 Entry of touch commands
31 Mode for initial positioning of control locations
32 Mode for entering touch commands
33 Identifying simultaneous contact on touch sensitive surface in at least 3 regions
34 Assigning finger contact regions
35 Recognizing removal of contact with the touch sensitive surface
36 Identifying contact in one or more finger contact regions
37 Identifying motion of the contact from the finger contact region
38 Recognizing an end to a touch entry (e.g. by recognizing a removal of contact from the touch sensitive surface)
39 Identifying a command based on the gesture and/or contact locations
40 Executing the control command
42 Point or region of contact with touch sensitive surface
44 Control location
46 Center of control location
48 Finger contacting control location
50 Movement of the contact
54 Touch sensitive surface
82 First direction
84 Second direction
86 Third direction
88 Fourth direction

What is claimed is:

1. A system comprising:
i) a controller device;
ii) a touch device mounted on a steering device of a vehicle proximate to a driver of a vehicle in communication with the controller device capable of recognizing contacts at multiple touch locations;
iii) a sound receiving device in communication with the controller device;
iv) one or more user-controlled device having one or more functions controlled by the controller device at least partially based on input from a user; and
v) a sound generating device in electrical communication with the controller device; wherein the sound generating device produces an audio signal, an audio question, or other sound for prompting a user to make an audio input;

wherein upon sensing a first input, the controller device identifies a control category associated with the first input, wherein the first input is one of a) a touch command based on a force contact on a surface of the touch device or b) an audio instruction inputted into the sound receiving device, the controller device communicates to the driver;

and upon additionally sensing a second input, the controller device identifies a control feature or a control element within the control category associated with the second input, wherein the second input is the other one of a) the touch command or b) the audio instruction, the controller device communicates a control function to the user-controlled device or directly controls the user-controlled device based on both the input on the touch device and the input received by the sound receiving device;

wherein the only communication from the controller device to the driver between the first and second input is via the sound generating device;

wherein the one or more user-controlled devices includes a smart phone;

the system recognizes 20 or more different touch commands each for precisely controlling a different control function, wherein each of the touch commands is based on one of the force contacts originating from one, two, three, or four of the contact locations, and each of the touch commands is based on the force contact on the surface of the touch device at one or more locations on the touch device, wherein the force contact is a tap, or a sliding motion in a single direction; and the touch device is positioned so that a vehicle driver can contact the surface with two, three or four fingers without removing his hands from the steering device.

2. The system of claim 1, wherein
the first input is the sensing the audio instruction inputted into the sound receiving device, and the second input is the sensing the touch command inputted on the touch device at one or more locations of the touch device, and the controller device identifies the control feature or the control element within the control category based on the force contact, the location(s) or both.

3. The system of claim 1, device; wherein the sound generating device produces an audio question.

4. The system of claim 1, wherein the system is a vehicle control system including,
wherein the touch device, the controller device, and the sound receiving device are in a vehicle, and the touch display device includes a touch sensitive surface free of a display.

5. The system of claim 1, wherein the one or more user-controlled device includes one or more devices selected from the group consisting of a sound device, a vehicle speed control device, a vehicle lighting device, a vehicle climate control device, and a device for receiving digital information from outside a vehicle, wherein the digital information includes a text message, weather information, travel conditions, road information, traffic information, news information, a video file, a sound file, a document file, or any combination thereof.

6. The system of claim 1, wherein the controller device includes:
a) a list of associations for a plurality of different contact directions and/or different touch locations, each having a different associated control category; and/or
b) a list of associations for a plurality of audio instructions, each having a different associated control function.

7. The system of claim 1, wherein the system includes a knob, a button, or a switch for inputting a selection.

8. The system of claim 1, wherein
upon identifying a first input on a surface of the touch device, the sound generating device generates a first sound and
upon identifying a different input on a surface of the touch device, the sound generating device generates a different sound.

9. The system of claim 1, wherein the touch device recognizes multiple simultaneous contacts on a surface and identifies a motion of one or more of the contacts in a direction and identifies which contact(s) are performing the motion, wherein the control category is selected based on the contacts making the motion, the number of contacts making the motion, and the type of the motion.

10. The system of claim 1, wherein each input on the surface is characterized by contact features including contact location(s), number of contact(s), and type of motion; wherein an association of contact features with control categories includes a plurality of contacts at different locations on the touch device followed by motion from only a portion of the contacts.

11. The system of claim 1, wherein:
the number of control categories is finite; and
the number of control categories is two or more;
wherein two categories are selected based on different directions of motion of the contact.

12. The system of claim 1, wherein
the control categories include a contact list having contact identifiers and phone numbers associated with some or all of the contact identifiers; or
a confirmation input into the touch device or the sound receiving device is required for one or more of the control functions.

13. The system of claim 1, wherein i) the user-controlled device includes a navigation system and the control is based on the input of an address or an address identifier received by the sound receiving device; and/or
ii) the user-controlled device includes a sound system and the control category includes selection of a file to play.

14. The system of claim 1, wherein
the touch sensitive surface is capable of identifying the location of multiple simultaneous contacts on the surface; and
the system includes an additional input device including a knob, a button, or a switch.

15. The system of claim 1, wherein the system pauses or stops the user-controlled device.

16. A method comprising the steps of:
i) a controller device sensing an audio instruction inputted into a sound receiving device;
ii) the controller device sensing a touch command based on a force contact on a touch device capable of recognizing contacts at multiple touch locations, wherein the touch command is at one or more of the touch locations, wherein the audio instruction is a first input and the touch command is a second input, or the touch command is the first input and the audio instruction is the second input;
iii) between receiving the first and second inputs, the controller device communicating to a driver of a vehicle only via a sound generating device;

iv) the controller device identifying a control category associated with the first input;
v) the controller device identifying a control feature or a control element within the control category, based on the second input; wherein the touch device is mounted on a steering device proximate to the driver for force contact by up to four fingers of the driver's hand;
wherein the controller device controls functions of one or more user-controlled devices including a smart phone; and
wherein the only communication from the controller device to the driver between the first and second input is via the sound generating device;
wherein the controller device recognizes 20 or more different touch commands each for precisely controlling a different control function, wherein each of the touch commands is based on one of the force contacts originating from one, two, three, or four of the touch locations, wherein the force contact is a tap, or a sliding motion in a single direction; and the touch device is positioned so that a vehicle driver can contact the surface with the one, two, three, or four fingers without removing his hands from the steering device.

17. The method of claim 16, wherein the controller device receives the audio instruction, the controller device identifies the control category based on the audio instructions; and the controller device then receives the touch device instructions.

18. The method of claim 16, wherein the controller device receives the touch device instruction, the controller device identifies the control category based on the touch device instructions; and the controller device then receives the audio instructions.

19. The method of claim 16, wherein the method includes:
a) a step of the controller device controlling the control feature or the control element of a user-controlled device; or
b) a step of repeatedly adjusting the control feature until a stop limitation is reached or until a stop instruction is received by the sound receiving device or the touch device; or
c) a step of setting up a control system.

20. The method of claim 16, wherein the touch display device includes a touch sensitive surface free of a display.

21. The method of claim 16, wherein the inputs using the touch display device are made by three fingers and each of the touch command is based on the force contact at one, two, or three contact locations on the touch display device.

* * * * *